US006313723B1

(12) United States Patent
Chen et al.

(10) Patent No.: US 6,313,723 B1
(45) Date of Patent: Nov. 6, 2001

(54) REMOTE CONTROLLABLE CIRCUIT BREAKERS WITH POSITIVE TEMPERATURE COEFFICIENT RESISTIVITY (PTC) ELEMENTS

(75) Inventors: William W. Chen, Marion; Bruce F. Lindholm, Cedar Rapids, both of IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/211,776

(22) Filed: Dec. 14, 1998

(51) Int. Cl.[7] .......................... H01H 75/00; H01H 77/00; H01H 83/00; H01H 73/00; H02H 5/04

(52) U.S. Cl. .................................... 335/6; 335/7; 335/13; 335/43; 361/103; 361/106; 361/115

(58) Field of Search ................................. 335/6–43, 202; 361/18, 20–50, 106, 115

(56) References Cited

U.S. PATENT DOCUMENTS 3,749,873 * 7/1973 Harper et al. ........................ 335/202
4,625,190 * 11/1986 Wafer et al. ........................... 335/20
5,296,996 * 3/1994 Hansson et al. ....................... 361/24
5,729,416 * 3/1998 Renkes et al. ......................... 361/23
5,886,860 * 3/1999 Chen et al. ............................. 361/9

* cited by examiner

*Primary Examiner*—Ramon M. Barrera
(74) *Attorney, Agent, or Firm*—Kareem M. Irfan; Larry I. Golden

(57) ABSTRACT

A circuit breaker and method for interrupting the flow of electric current in a line having a load and a source including a first switch connected in series with the line and a first actuating device coupled to the first switch and adapted to be actuated by at least one activating signal, to move the first switch from the closed position to the open position. A resistor having a positive temperature coefficient of resistivity is connected in series with the first switch and a voltage limiting device is connected in parallel with the resistor. A second actuating device is coupled to the first switch and is adapted to be actuated by at least one remote control activating signal, to move the first switch to the open position or to the closed position. The second actuating device further includes a coil and a second switch connected to the coil and to the line, the second switch adapted for activating the coil upon the receipt of the remote control activating signal. A pull bar is connected to the coil and coupled to the first switch wherein the pull bar is adapted to move the first switch to the open position when the coil activated and to the closed position when the coil is not activated.

28 Claims, 4 Drawing Sheets

REMOTE CONTROLLABLE CIRCUIT BREAKERS WITH POSITIVE TEMPERATURE COEFFICIENT RESISTIVITY (PTC) ELEMENTS

BACKGROUND OF THE INVENTION

1. Field of the Invention

The invention relates to the use of remote controllable circuit breakers with positive temperature coefficient resistivity (PTC) elements and reduced size and weight thermoplastic cases.

2. Background of the Art

Remote controllable circuit breakers are widely used for the interruption of electrical current in power lines upon conditions of severe overcurrent caused by short circuits or by ground faults. The remote signal is, for example, transmitted from a personal computer hundreds of miles away. The prior art circuit breakers include disadvantages such as, a very large size and high costs.

FIG. 1 (prior art) is a longitudinal sectional view of a typically remote controllable circuit breaker 10 for interrupting the flow of electrical current in a line. The circuit breaker 10 is, for example, the QOAS™ circuit breaker, manufactured by Square D Company, which is large in size and weight and very costly to manufacture. The circuit breaker 10 can be turned on or off by a remote signal while the breaker in the "ON" position. The remote control function of the circuit breaker 10 is of FIG. 1 is accomplished using a small motor 12, which is a very expensive part in such circuit breakers. When the circuit breaker 10 in the "ON" position, current is received at the line terminal 14 and passes through the two closed contacts 16 and 18, respectively. The contact 16 is welded onto blade 20. The current passes through the blade 20 to a bimetal 22, and leaves the circuit breaker 10 through terminal 24 and lug 26. The circuit breaker 10 includes an operating handle 11 and a spring 21 connected to the blade 20.

When a remote signal to turn the circuit breaker 10 off is received by printed circuit board 28, the motor 12 rotates driver 30 counter-clockwise. A sector gear 32 translates the rotation into a displacement of a lever 34. The lever 34 pulls the blade 20 and separates the contacts 16 and 18, respectively. The current is then interrupted or "turned off", and the circuit breaker 10 remains in the "OFF" position until another remote control signal is received to turn the circuit breaker 10 on. When a remote control signal to turn the circuit breaker 10 on is received by the printed circuit board 28, the motor 12 rotates clockwise. The sector gear 32 forces the lever 34 to push the blade 20 and close the contacts 16 and 18, respectively, wherein the flow of current may be resumed.

The circuit breaker 10 includes conventional technology, such as the bimetal 22 used for overload protection. When the circuit breaker 10 is in an overload situation, such as 135% of the rated current, the high current brings additional heat to the bimetal 22. The bimetal 22 is deflected by the heat and causes a trip lever 36 to detach. Circuit breakers using bimetal for overload protection must be calibrated. The calibration is performed using screw 38. Calibration of the bimetal circuit breakers typically causes problems, and the manufacture of these types of circuit breakers including the bimetal is costly. The bimetal used in the circuit breakers does not behave consistently, even after calibration, and therefore, some circuit breakers will not trip at the rated 135% overload situation. In addition to many of the other problems associated with the use of bimetal in circuit breakers is terminal cracking, particularly in miniature circuit breakers. The calibration of the miniature circuit breakers also results in high stress of the load terminal.

For short circuit interruptions, the prior art circuit breaker 10 uses arc stacks 40 and a large arc chamber, large contacts 16 and 18, and a large separation between the two contacts after the circuit breaker 10 trips. One of the problems associated with the process of interruption of the current during severe overcurrent conditions is arcing. Arcing occurs between the contacts of circuit breakers used to interrupt the current, which is highly undesirable for several reasons. Arcing causes deterioration of the contacts or blades of the breaker and causes gas pressure to build up. Arcing also necessitates circuit breakers with larger separation between the contacts in the open position to ensure that the arc does not persist with the contacts in the fully open position. In the circuit breaker 10 of FIG. 1, the large components and designs are used because almost 100% of the interruption energy becomes arcing, which generates high interruption pressure during a short circuit interruption. At least six rivets 42 are typically used in the prior art circuit breaker 10 design to hold the circuit breaker cover and base together because of interruption pressure. The interruption pressure also causes damage to end use equipment.

Another disadvantage in the prior art circuit breaker 10 design involves the mag-trip function. If the current through the circuit breaker 10 reaches a value higher than a predetermined value such as, for example, approximately 500% of the ampere rating, the circuit breaker 10 trips before the bimetal 22 has a chance to deflect. The predetermined current value is the mag-level of the circuit breaker 10. An armature 44 and yoke 46 provide the tripping function. Under normal conditions, there is an air gap between the armature 44 and the yoke 46. When the current reaches the predetermined mag-level, the armature 44 is pulled to the yoke 46 to close the air gap. The trip lever 36 is then delatched and the flow of electrical current in the line is cut off instantaneously by the circuit breaker 10. However, the prior art designs of the armature 44 and yoke 46 cannot ensure consistent mag-levels among a batch of the same circuit breakers. The standard deviation of the mag-level of the prior art circuit breakers is too large to consistently protect circuits.

The prior art circuit breakers include disadvantages such as, a very large size and high costs. In order to hold the existing circuit breaker 10 mechanisms, such as the motor 12 and tripping mechanisms, the circuit breaker 10 base and enclosure (not shown) is designed with a very large size. The motor 12, the large contacts 16 and 18, the arc stacks 40 and the calibration of the bimetal 22 all contributes to the costly manufacturing of the existing circuit breaker 10 design. The thermosetting material used in manufacturing the base (not shown) and cover 48 of the circuit breaker 10 is also costly, especially compared to the manufacturing and use of thermoplastic cases. Other disadvantages in the prior art circuit breaker design include mechanical variations, and wear and contamination of parts.

Chen (U.S. Pat. No. 5,629,658) discloses a number of devices in which PTC elements are used in conjunction with two or more switches to limit the current under short circuit conditions and thereby reduce the associated arcing. U.S. patent application Ser. No. 08/918,768, filed Aug. 25, 1997 (Chen et al.) also discloses a number of devices in which PTC elements are used in conjunction with two or more switches to limit the current under short circuit conditions.

There is a need, therefore, for a circuit breaker design which is less costly to manufacture, is more reliable across a batch of circuit breakers manufactured and is of a much smaller size overall.

SUMMARY OF THE INVENTION

The present invention provides a circuit breaker and method for interrupting the flow of electric current in a line having a load and a source including a first switch, having an open and a closed position, connected in series with the line. A first actuating device is coupled to the first switch and is adapted to be actuated by at least one activating signal, to move the first switch from the closed position to the open position. A resistor having a positive temperature coefficient of resistivity is connected in series with the first switch and a voltage limiting device is connected in parallel with the resistor. A second actuating device is coupled to the first switch and is adapted to be actuated by at least one remote control activating signal, to move the first switch to the open position or to the closed position.

The second actuating device further includes a coil and a second switch connected to the coil and to the line, the second switch having an open position and a closed position. The second switch is adapted for activating the coil, wherein the second switch is adapted to move to the open position or to the closed position upon the receipt of the remote control activating signal. A pull bar is connected to the coil and coupled to the first switch wherein the pull bar is adapted to move the first switch to the open position when the coil activated and to the closed position when the coil is not activated. The second switch is, for example, an SCR.

The second actuating device further includes a first coil and a second switch connected to the first coil and to the line, the second switch having a nonconducting state and a conducting state. The second switch is adapted for activating the first coil, wherein the second switch is adapted to change to the nonconducting state or to the conducting state upon receipt of the remote control activating signal. A pull bar is connected to the first coil and coupled to the first switch wherein the pull bar is adapted to move the first switch to the open position when the first coil activated and to the closed position when the first coil is not activated. The second switch is, for example, an SCR.

The first actuating device further includes a second coil and a third coil. The second coil is connected in series and the first switch and adapted to be actuated by a first activating signal, to move the first switch from the closed position to the open position. The third coil is connected in parallel with the resistor and adapted to be actuated by a second activating signal, to move the first switch from the closed position to the open position. The resistor provides the second activating signal to the third coil. The second coil and the third coil are wound around a common cylindrical core.

BRIEF DESCRIPTION OF THE DRAWINGS

For detailed understanding of the present invention, reference should be made to the following detailed description of the preferred embodiment, taken in conjunction with the accompanying drawings, in which like elements have been given like numerals.

DETAILED DESCRIPTION OF PREFERRED EMBODIMENTS

For exemplary purposes, the present invention is illustrated and described with respect to a single phase circuit breaker, although the circuit breaker design of the present invention is equally applicable to circuit breakers of a different number of phases, such as a three-phase circuit breaker.

Figure 2:
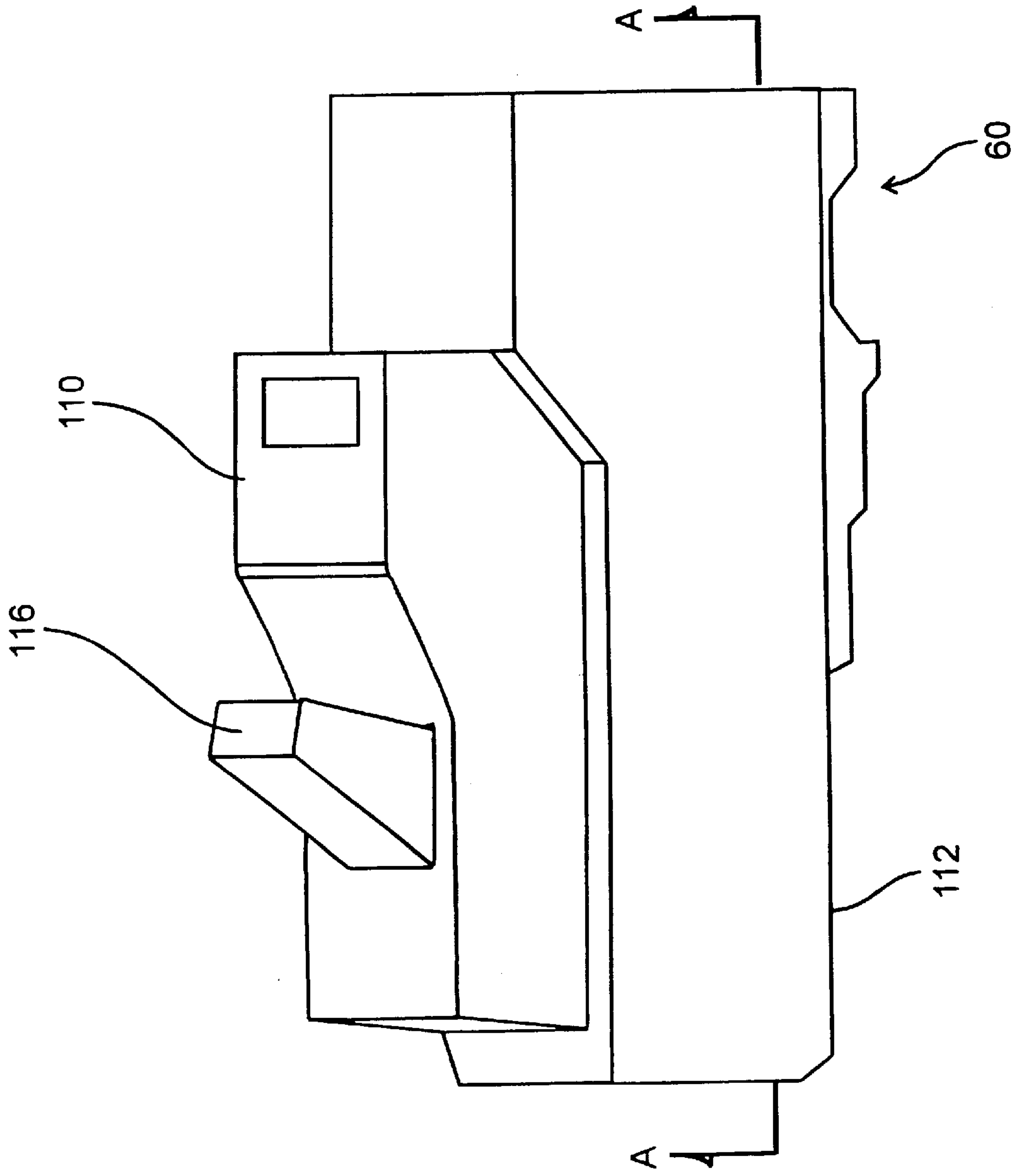
FIG. 2 is a perspective view of a remote controllable circuit breaker in accordance with the present invention.

Referring to FIG. 2, a circuit breaker 60 is shown having a base 110, cover 112, and operating handle 116 all preferably manufactured of a thermoplastic material. The cover 112 secures the circuit breaker 60 components in the base 110 and is, for example, snap fitted in place.

Figure 3:
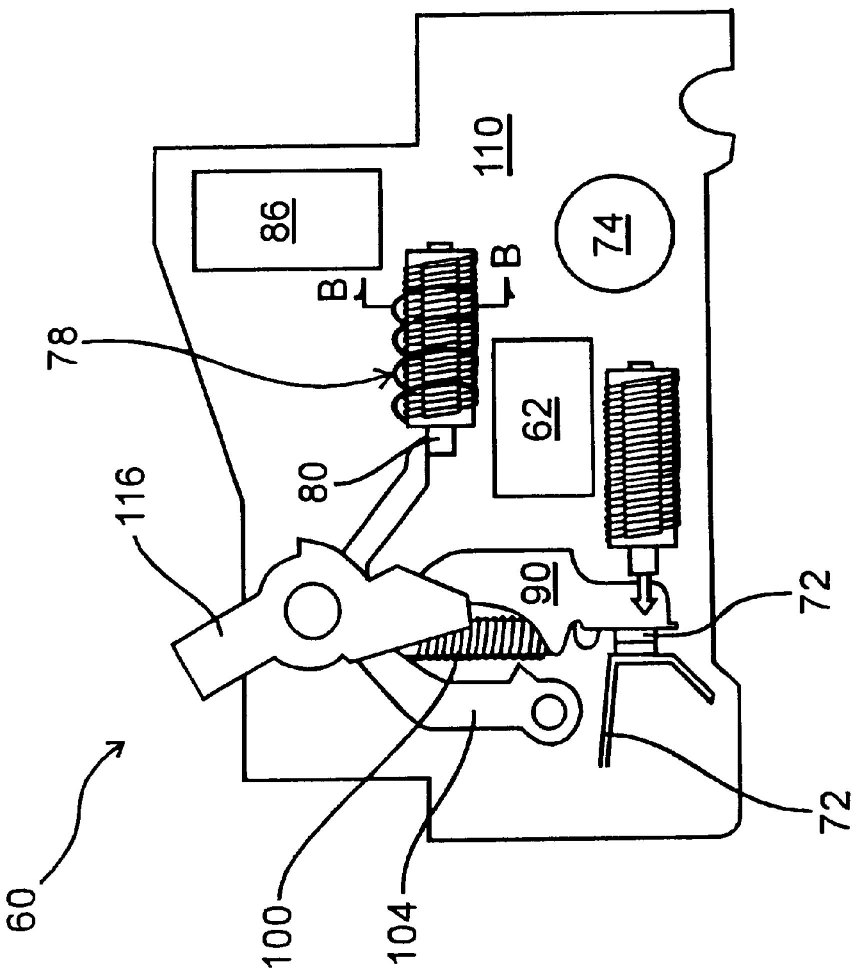
FIG. 3 is a longitudinal sectional view of the remote controllable circuit breaker of FIG. 2 taken generally along the line A—A of FIG. 2 and including a PTC element according to the present invention.
Figure 4:
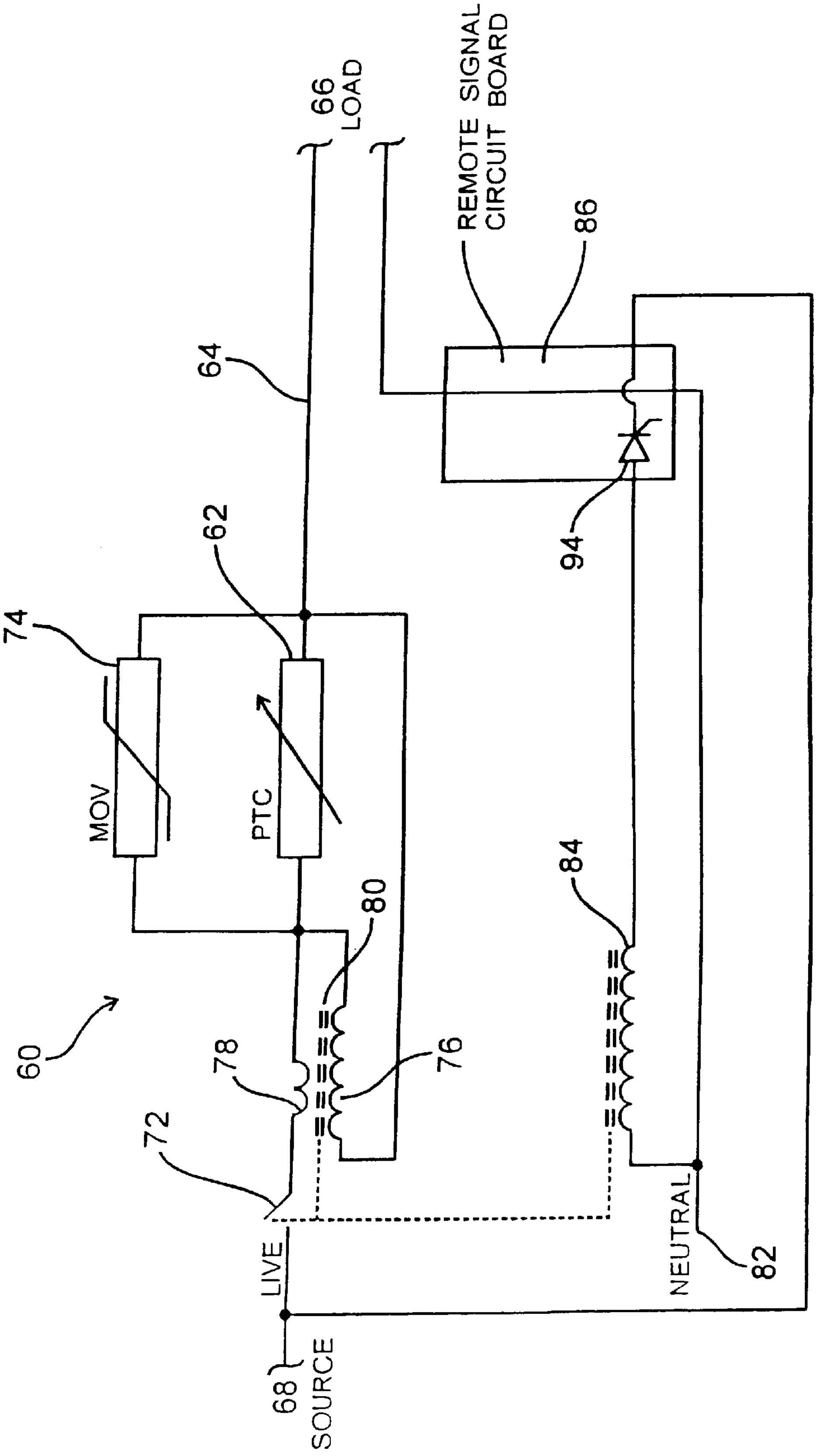
FIG. 4 illustrates the circuitry of one phase of the circuit breaker of FIG. 3 according to the present invention.

FIG. 3 shows a longitudinal sectional view of the remote controllable circuit breaker 60 particularly illustrating the operating mechanism of the circuit breaker 60. The circuit beaker 60 includes a polymer element having a positive temperature coefficient of resistivity (a PTC element 62) according to the present invention. FIG. 4 illustrates the circuitry of the circuit breaker 60 of FIG. 3. The circuit breaker 60 according to the present invention is a remote controllable circuit breaker 60 for interrupting the flow of electrical current in a line 64 having a load 66 and a source 68 and further includes a thermoplastic base 110 and cover 112. The circuit breaker 60 is connected in series with the main circuit live line 64. The neutral line 82 is also indicated in FIG. 3.

The PTC element 62 is connected in series with the main circuit line 64. The PTC element 62 is preferably a conductive polymer, such as, for example, Poly-Switches™ manufactured by Raychem and Bourns, or, alternatively any PTC material having the desired resistivity value. A switch or a set of contacts 72 is connected in series with the main circuit line 64 and in series with the PTC element 62. One or more metal oxide varistors 74 (MOV) and a coil 76 are connected in parallel with the PTC element 62 respectively. In order to limit the complexity of the figures, only one varistor 74 is shown. The purpose of the varistor 74 is to protect the PTC element 62 during a short circuit interruption. The rated voltage of the varistor 74 has to be equal to or smaller than the rated voltage of the PTC element 62. A series coil 78 is also connected in series with the main circuit line 64. The series coil 78 is, for example, wound around the same core 80 as the trip coil 76. The series coil 78 and the coil 76 act as actuating devices for the switch or contacts 72. For the sake of simplicity, FIGS. 3 and 4 do not illustrate all of the electronic components in the circuit breaker.

A solenoid 84 is connected to the main circuit line 64 on the source 68 side through a printed circuit board, such as a remote signal circuit board 86. As shown in FIG. 4, the solenoid 84 is mounted on a base 110 of the circuit breaker 60 and adjacent to blade 90. The solenoid 84 is remotely controlled through the remote signal circuit board 86. A pull bar 92 is inserted in the center of the solenoid 84 and attached to the blade 90.

The solenoid 84 and the pull bar 92 provide the remote control functions in the circuit breaker 60 and act as an actuating device on the switch or contacts 72. The solenoid 84 and the pull bar 92 turn the circuit breaker 60 off when the circuit breaker 60 is in the "ON" position, if the appropriate remote signal is received by the remote signal circuit board 86. For example, an operator or computer sends a signal to the remote signal circuit board 86. The remote sign circuit board 86 includes an SCR (semiconductor-controlled rectifier) 94 that conducts upon detection of the signal. The effect of this is to apply the full line voltage across the solenoid 84 thus activating it; the PTC element 62 and the varistor 74 are bypassed.

Current flowing through the solenoid 84 generates a magnetic force wherein the pull bar 92 is moved causing the blade 90 to separate the contacts 72. The current in the solenoid 84 remains until a remote signal to turn on the circuit breaker is received. For example, the operator or computer sends a signal to the remote signal circuit board 86 to turn the circuit breaker 60 on wherein the current in the solenoid 84 is cut off, and the magnetic force acting on the pull bar 92 is removed. A spring 100 will pull the blade 90 back to its original position and close the contacts 72 wherein the circuit breaker 60 is "turned on". The solenoid 84 of the present invention provides the remote control functions of the circuit breaker 60 at a much lower cost than the motors used in the prior art circuit breakers.

Under normal operations, most of the current goes through the PTC element 62 instead of the coil 76 because the cold resistance of the PTC element 62 is much lower than that of the coil 76. The PTC element 62 is heated by the current under small overload situations such as 135% and 200% of the ampere rating of the circuit breaker 60. The resistance of the PTC element 62 increases sharply as its temperature increases over a threshold. The voltage across the PTC element 62 will reach the predetermined value, and thus energize the coil 76. The coil 76 is energized to push a latching rod which also acts as the core 80 to the right and unlatch a trip lever 104 when the voltage across the PTC element 62 and the current through the PTC element 62 reach certain predetermined values. The flow of electrical current in the line 64 is then interrupted by the circuit breaker 60.

If the current through the breaker reaches a value higher than another predetermined value, such as, for example, about 500% of the ampere rating of the circuit breaker 60, a large current going through the series coil 78 generates enough magnetic force to delatch the trip lever 104. The series coil 78 provides the mag-trip function and open the contacts 72 faster than the coil 76 under high current levels. The series coil 78 and the trip coil 76 are wound around the same core 80 which is, preferably a cylindrical core 80. Typically the cross section of the armature and yoke of the prior art designs are rectangular and the size is much larger. The use of a cylindrical core 80, smaller in cross section and in length than the prior art yoke, with the series coil 78 and the trip coil 76 provides the same electromagnetic strength as the larger size armature and yoke mechanisms of the prior art circuit breakers.

Figure 1:
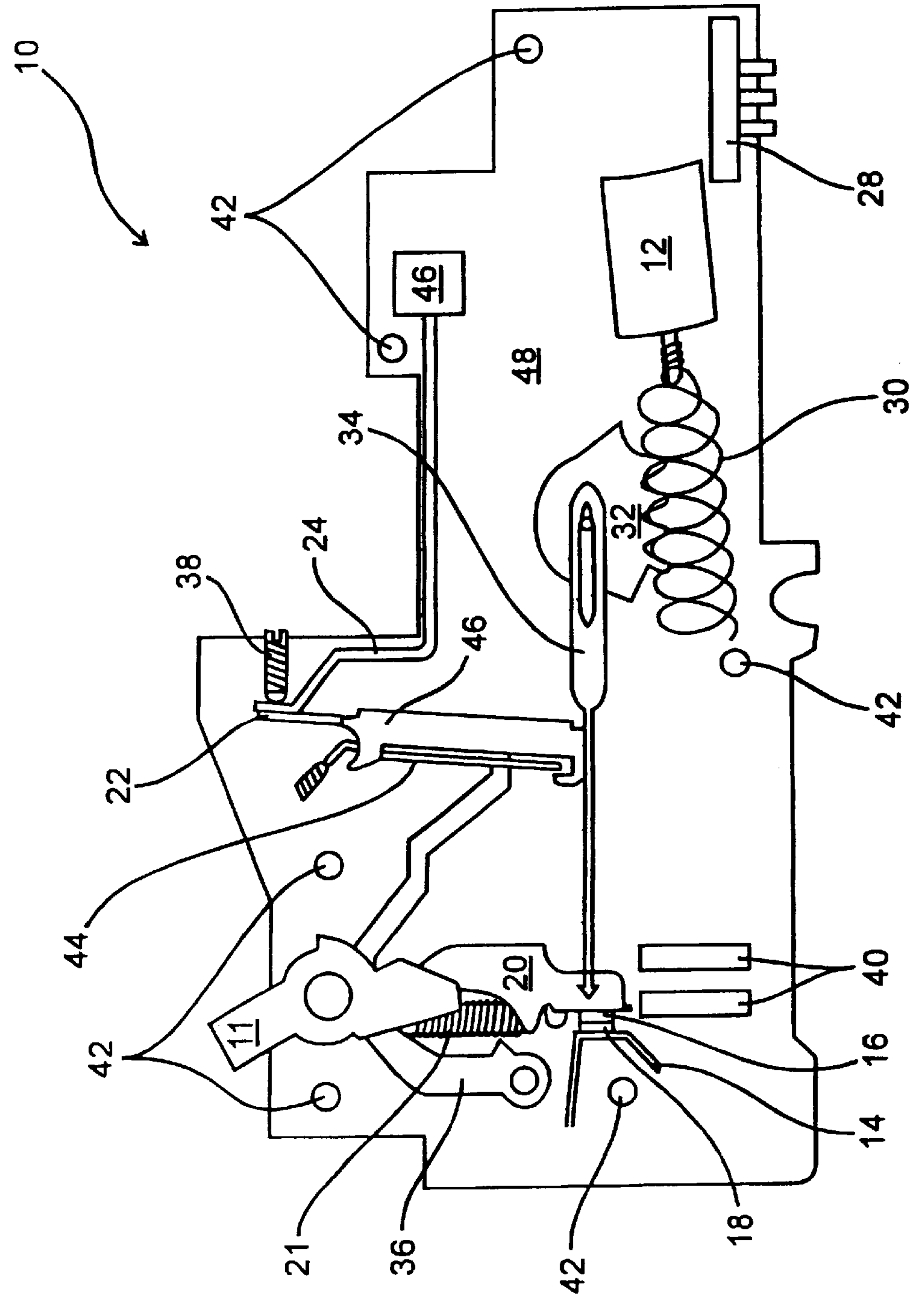
Fig. 1 PRIOR ART
FIG. 1 (prior art) is longitudinal sectional view of a prior art remote controllable circuit breaker.

The mag-trip mechanism of the present invention provides advantages over the mag-trip mechanism of the prior art circuit breaker 10 shown in FIG. 1. One advantage is that the series coil 78 provides more consistent mag-trip levels in a batch of the same circuit breakers than the armature and yoke mechanisms of the prior art circuit breakers. Another advantage is that the mag-trip mechanism including the series coil 78 in the circuit breaker 60 of the present invention occupies less space than that of the prior art mag-trip mechanism.

During a short circuit, the high short circuit current heats the PTC element 62 quickly, for example, within approximately a millisecond, which generates a voltage across the PTC element 62. The voltage across the PTC element 62 is typically high enough to overcome the system voltage and limits the short circuit current. The MOV 74 provides a shunt path for the extra current during a short circuit interruption, and thus protects the PTC element 62 from breaking down. After the interruption energy is consumed or extinguished, the contacts 72 are opened by the operation of the coil 78, the trip lever 104, and the spring 100.

Because the arcing energy is small, the contacts 72 in the present invention are manufactured smaller than those needed in the prior art circuit breaker designs. Also, the separation distance between the contacts 72 after the circuit breaker 60 trips is dramatically reduced. For example, two to three millimeter separation between the contacts 72 in the circuit breaker 60 of the present invention is sufficient, wherein the distance between the contacts 16 and 18 in the prior art circuit breaker 10 in FIG. 1 must be greater than 1 centimeter. The large separation of the contacts 16 and 18 in the prior art circuit breaker 10 is required because of the short circuit interruption. In the present invention, the PTC element 62 and MOV 74 perform the interruption operation, and the contacts 72 separate after the interruption is completed by the PTC element 62 and MOV 74. With the small contact separation, the circuit breaker 60 of the present invention still passes UL489 or IEC898 requirements.

Since there is little arcing during a short circuit interruption, there is also no pressure on the circuit breaker 60 cover 112, and base 110 during the interruption. The bimetal calibration is also no longer necessary in the circuit breaker 60 of the present invention. Because of the reduced pressure and wear on the circuit breaker 60, the cover 112, and base 110 are, for example, manufactured of a thermoplastic material. The thermoplastic material used for the circuit breaker 60 of the present invention includes, for example, a 0.060 inch minimum wall thickness which will decrease mold cycle time from typically 20 seconds to approximately 5 seconds. The prior art circuit breaker designs typically requires hours of time for base baking and deflashing. The use of thermoplastic cases in the present invention eliminates the need for base baking and deflashing and will shorten the manufacturing and assembly time by approximately ten hours. The rivets 42 in the prior art circuit breaker 10 of FIG. 1 can also be replaced with snap fit and/or ultrasonic staking for assembly of the circuit breaker 60 according to the present invention. Typically, in prior art circuit breaker designs, snap fitting or ultrasonic staking would not be used because of the high pressures.

Therefore, the circuit breaker of the present invention including the use of a PTC element, a mag-trip mechanism including a solenoid and series coil wrapped around a single core and remote control solenoid provides numerous advantages over the prior art remote controllable circuit breaker designs including dramatically reduced cost and greatly reduced size. For example, the size of the circuit breaker of the present invention is reduced to approximately half the size of the prior art circuit breaker design.

While preferred embodiments have been shown and described, various modifications and substitutions may be made thereto without departing from the spirit and scope of the invention. Accordingly it is to be understood that the present invention has been described by way of illustrations and not limitations.

What is claimed is:

1. A circuit breaker for interrupting the flow of electric current in a line comprising:

a first switch, having an open and a closed position, connected in series with the line;

an actuating device coupled to the first switch, said actuating device actuated upon receipt of at least one activating signal, to move the first switch from the closed position to the open position;

a remotely controlled actuating device coupled to the first switch, said remotely controlled actuating device actuated upon receipt of at least one remote control activating signal, to move the first switch to the open position or to the closed position;

a first coil;

a second switch connected to the first coil and to the line, the second switch having a nonconducting state and a conducting state, and adapted for activating the first coil, wherein the second switch is adapted to change to the nonconducting state or to the conducting state upon the receipt of a remote control activating signal; and a pull bar connected to the first coil and coupled to the first switch wherein the pull bar is adapted to move the first switch to the open position when the first coil is activated and to the closed position when the first coil is not activated.

2. A circuit breaker, as recited in claim 1, wherein the second switch is a silicon-controlled rectifier (SCR).

3. A circuit breaker, as recited in claim 1, further comprising:

a thermoplastic cover and thermoplastic base for enclosing the circuit breaker components.

4. A circuit breaker, as recited in claim 3, further comprising:

snap fit connections for mounting the circuit breaker cover on the base.

5. A circuit breaker, as recited in claim 3, further comprising:

ultrasonic stakes for mounting the circuit breaker cover on the base.

6. A circuit breaker, as recited in claim 1, further comprising:

a resistor having a positive temperature coefficient of resistivity connected in series with the first switch.

7. A circuit breaker, as recited in claim 6, further comprising:

a voltage limiting device connected in parallel with the resistor.

8. A circuit breaker, as recited in claim 6, wherein said at least one activating signal comprises a first activating signal and a second activating signal and the actuating device further comprises:

a second coil connected in series with the line and the first switch, said second coil actuated upon receipt of the first activating signal, to move the switch from the closed position to the open position;

a third coil connected in parallel with the resistor, said third coil actuated upon receipt of the second activating signal, to move the first switch from the closed position to the open position, wherein the resistor provides the second activating signal; and wherein the second coil and the third coil are wound around a common cylindrical core.

9. A method for interrupting the flow of electric current in a line comprising:

connecting a first switch, having an open and a closed position, in series with the line;

coupling an actuating device to the first switch, said actuating device actuated upon receipt of at least one activating signal, to move the first switch from the closed position to the open position;

coupling a remotely controlled actuating device to the first switch, said remotely controlled actuating device actuated upon receipt of at least one remote control activating signal, to move the first switch to the open position or to the closed position; and connecting a second switch to a first coil and to the line, the second switch having a nonconducting state and a conducting state, and adapted for activating the first coil, wherein the second switch is adapted to change to the nonconducting state or to the conducting state upon the receipt of a remote control activating signal;

connecting a pull bar to the first coil; and coupling the pull bar to the first switch wherein the pull bar is adapted to move the first switch to the open position when the first coil is activated and to the closed position when the first coil is not activated.

10. A method, as recited in claim 9, wherein the second switch is a silicon-controlled rectifier (SCR).

11. A method, as recited in claim 9, further comprising:

enclosing the circuit breaker components in a thermoplastic cover and thermoplastic base.

12. A method, as recited in claim 11, further comprising:

mounting the circuit breaker cover on the base using snap fit connections.

13. A method, as recited in claim 11, further comprising:

mounting the circuit breaker cover on the base using ultrasonic stakes.

14. A method, as recited in claim 9, further comprising:

connecting a resistor having a positive temperature coefficient of resistivity in series with the first switch.

15. A method, as recited in claim 14, further comprising:

connecting a voltage limiting device in parallel with the resistor.

16. A method, as recited in claim 14, wherein said at least one activating signal comprises a first activating signal and a second activating signal and wherein coupling the actuating device further comprises:

connecting a second coil in series with the line and the first switch, said second coil actuated upon receipt of the first activating signal, to move the first switch from the closed position to the open position;

connecting a third coil in parallel with the resistor, said third coil actuated upon receipt of the second activating signal, to move the first switch from the closed position to the open position, wherein the resistor provides the second activating signal; and winding the second coil and the third coil around a common cylindrical core.

17. A circuit breaker for interrupting the flow of electric current in a line, comprising:

a first switch, having an open and a closed position, connected in series with the line;

an actuating device coupled to said first switch, adapted to be actuated by at least one activating signal, to move said first switch from the closed position to the open position;

a resistor having a positive temperature coefficient of resistivity connected in series with said first switch;

a voltage limiting device connected in parallel with said resistor;

a first coil;

a second switch connected to said first coil and to the line, said second switch having a nonconducting state and a conducting state, and adapted for activating said first coil, wherein said second switch is adapted to change to the nonconducting state or to the conducting state upon the receipt of a remote control activating signal; and a pull bar connected to said first coil and coupled to said first switch wherein said pull bar is adapted to move said first switch to the open position when said first coil is activated and to the closed position when said first coil is not activated.

18. A circuit breaker, as recited in claim 17, wherein the second switch is a silicon-controlled rectifier (SCR).

19. A circuit breaker, as recited in claim 17, wherein said at least one activating signal comprises a first activating signal and a second activating signal and said actuating device further comprises:

a second coil connected in series with the line and said first switch, adapted to be actuated by the first activating signal, to move said first switch from the closed position to the open position;

a third coil connected in parallel with said resistor, adapted to be actuated by the second activating signal, to move said first switch from the closed position to the open position, wherein said resistor provides the second activating signal; and wherein said second coil and said third coil are wound around a common cylindrical core.

20. A circuit breaker, as recited in claim 17, further comprising:

a thermoplastic cover and thermoplastic base for enclosing the circuit breaker components.

21. A circuit breaker, as recited in claim 20, further comprising:

snap fit connections for mounting said cover on said base.

22. A circuit breaker, as recited in claim 20, further comprising:

ultrasonic stakes for mounting said cover on said base.

23. A method for interrupting the flow of electric current in a line, comprising:

connecting a first switch, having an open and a closed position, in series with the line;

coupling an actuating device to said first switch, adapted to be actuated by at least one activating signal, to move said first switch from the closed position to the open position;

connecting a resistor having a positive temperature coefficient of resistivity in series with said first switch;

connecting a voltage limiting device in parallel with said resistor;

connecting a second switch to a first coil and to the line, said second switch having a nonconducting state and a conducting state and adapted for activating said first coil, wherein said second switch is adapted to change to the nonconducting state or to the conducting state upon the receipt of a remote control activating signal;

connecting a pull bar to said first coil; and coupling said pull bar to said first switch wherein said pull bar is adapted to move said first switch to the open position when said first coil is activated and to the closed position when said first coil is not activated.

24. A method, as recited in claim 23, wherein said second switch is a silicon-controlled rectifier (SCR).

25. A method, as recited in claim 23, wherein said at least one activating signal comprises a first activating signal an a second activating signal and wherein said coupling said actuating device further comprises:

connecting a second coil in series with the line and said first switch, adapted to be actuated by the first activating signal, to move said first switch from the closed position to the open position;

connecting a third coil in parallel with said resistor, adapted to be actuated by the second activating signal, to move said first switch from the closed position to the open position, wherein said resistor provides the second activating signal; and winding said second coil and said third coil around a common cylindrical core.

26. A method, as recited in claim 23, further comprising:

enclosing the circuit breaker components in a thermoplastic cover and thermoplastic base.

27. A method, as recited in claim 26, further comprising:

mounting said cover on said base using snap fit connectors.

28. A method, as recited in claim 26, further comprising:

mounting said cover on said base using ultrasonic stakes.

* * * * *